United States Patent [19]

Smyers et al.

[11] Patent Number: 4,625,091
[45] Date of Patent: Nov. 25, 1986

[54] METHOD AND APPARATUS FOR WELDING A COVER ON A CIRCUIT ENCLOSURE

[75] Inventors: Michael K. Smyers, Olathe; Jack R. Kay, Overland Park, both of Kans.

[73] Assignee: Polaris Electronics Corp., Olathe, Kans.

[21] Appl. No.: 728,604

[22] Filed: Apr. 29, 1985

[51] Int. Cl.⁴ .................. B23K 11/32; B23K 11/10
[52] U.S. Cl. .................... 219/86.24; 219/91.2; 219/87; 219/158
[58] Field of Search .............. 219/78.01, 86.1, 86.24, 219/86.25, 87, 89, 158, 160, 91.1, 91.2; 228/180.1, 180.2

[56] References Cited

U.S. PATENT DOCUMENTS

| | | | |
|---|---|---|---|
| 2,916,604 | 12/1959 | Doelp | 219/85 |
| 3,392,256 | 7/1968 | Bradham, III | 219/79 |
| 3,887,996 | 6/1975 | Hartleroad et al. | 228/180.1 X |
| 4,331,253 | 5/1982 | Gordon et al. | 219/87 X |

FOREIGN PATENT DOCUMENTS 994437  6/1975  United Kingdom .............. 219/78.01

*Primary Examiner*—Harold Broome
*Assistant Examiner*—C. M. Sigda
*Attorney, Agent, or Firm*—Schmidt, Johnson, Hovey & Williams

[57] ABSTRACT

The cover and case of fusible material forming the enclosure for a semiconductor chip are provided with a hermetically sealed joint in the form of a "stitch" weld along the marginal edge of the cover by multiple impulse, overlapped spot welding, with the heat of the welding current confined to a zone spanning the distance between a pair of pressure-imparting electrodes and transmitted transversely of the side wall of the case, thereby avoiding heat transfer across the case with consequent damage to the circuitry, electrical devices, semiconductor material and other contents of the case. A special carrier provides a mount for the case and, through use of a template on the carrier and a drive associated with the template, the case and cover are advanced or indexed in small increments after each resistance weld cycle, relocating the package in readiness for the next succeeding welding step.

20 Claims, 5 Drawing Figures

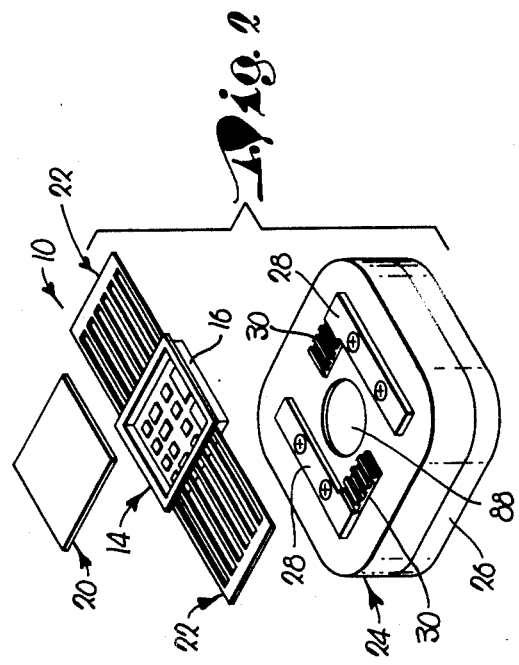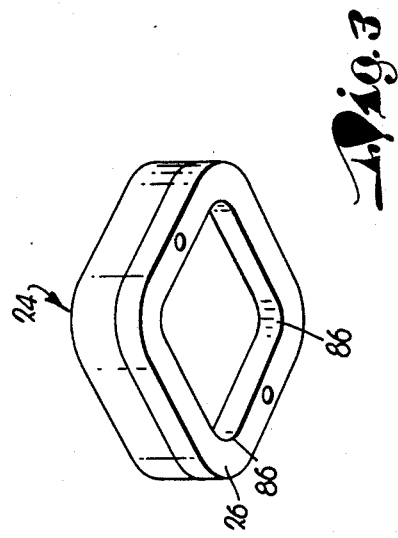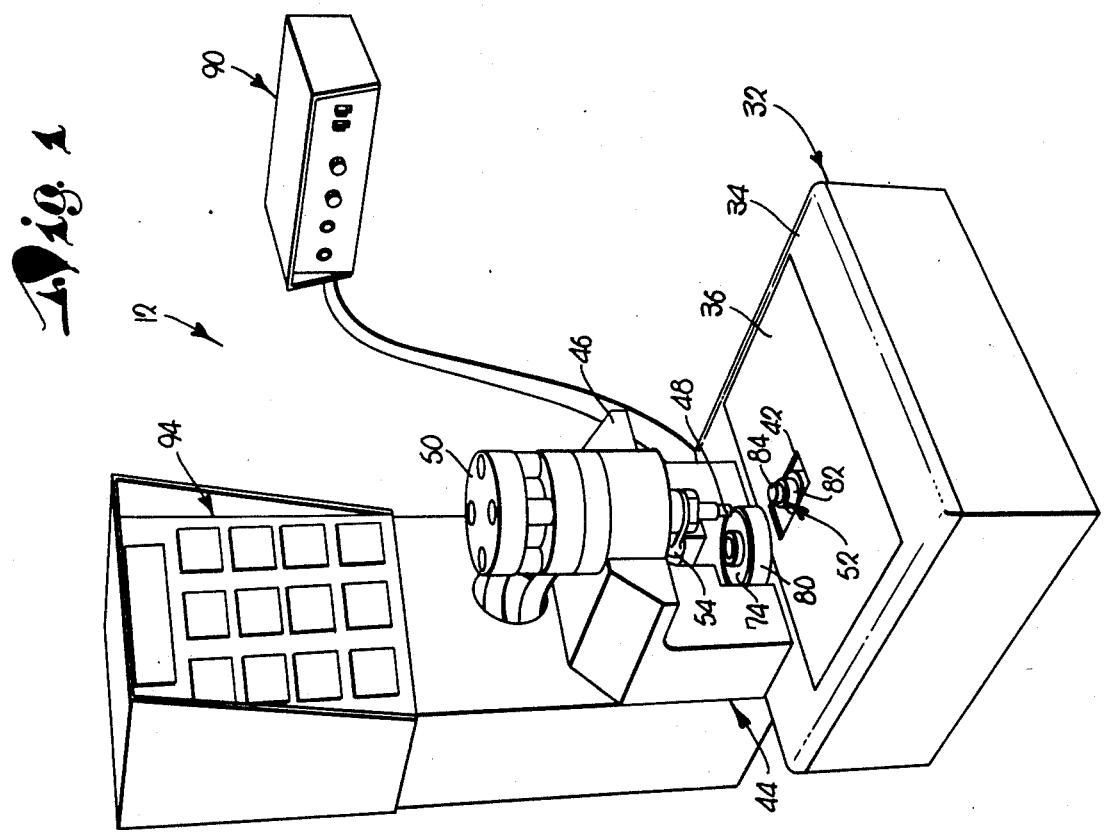

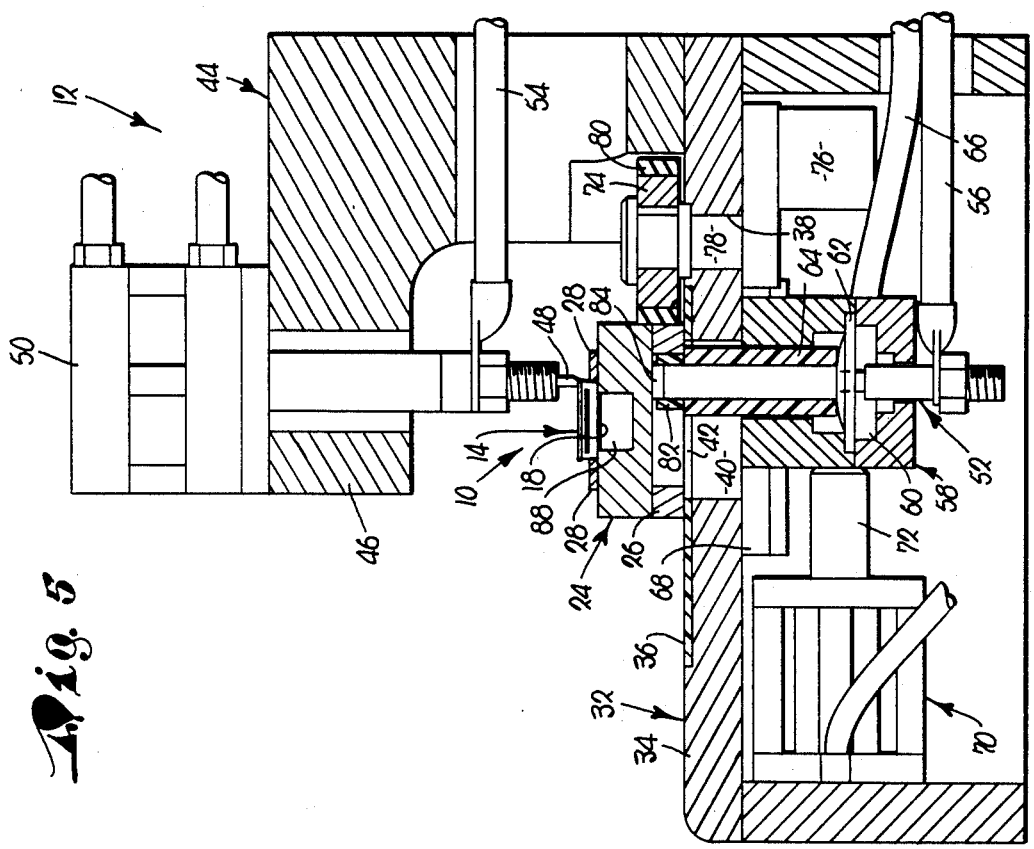
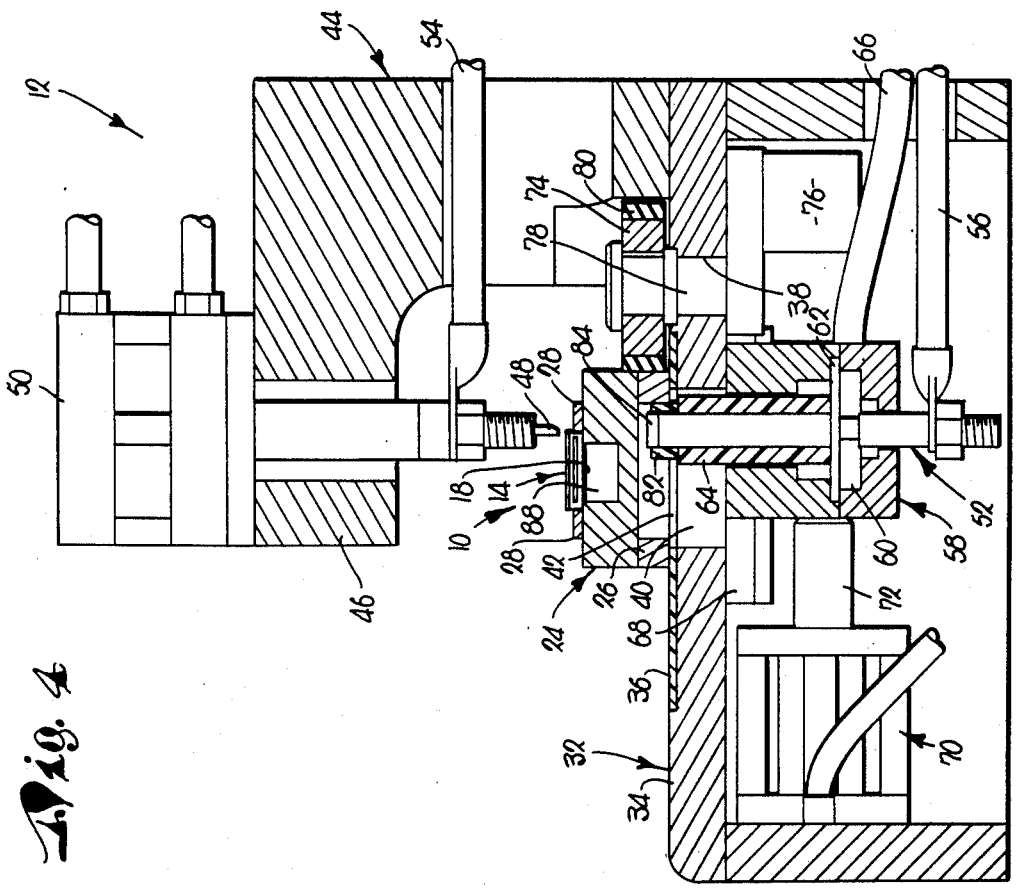

METHOD AND APPARATUS FOR WELDING A COVER ON A CIRCUIT ENCLOSURE

BACKGROUND OF THE INVENTION

The present invention relates to a method and apparatus for welding the enclosure for a semiconductor chip whereby the contents of the chip are protected against heat damage as the welding method forms a hermetically sealed joint along the marginal edges of the case and cover for the chip.

Vital to the proper protection of a semiconductor chip is the of provision of a hermetic seal between the case and the cover which enclose the chip. Made from metal or other fusible material, the case and cover are normally welded together by resistance welding which creates high temperatures because of the heat of the welding current. By use of conventional equipment and methods, the heat, transmitted across the case, oftentimes causes extensive damage to the components of the integrated circuit or other electrical parts and the semiconductor materials contained in the case.

We provide a solution to the problem by locating aligned electrodes directly below and above the case and its cover so that the heat which is generated by the welding current travels only along a relatively narrow path from the cover, traversing the side wall of the case rather than dissipating during and after each weld cycle across the contents of the case from side to side thereof.

The chip package and a special carrier therefor are clamped between the electrodes during each welding step and a drive is provided to index the package forwardly after each impulse. A template on the carrier serves as a guide to assure proper location of the package relative to the electrodes.

IN THE DRAWINGS

FIG. 1 is a perspective view of apparatus made pursuant to the present invention for carrying out our method of welding a cover on a chip enclosure;

FIG. 2 is an exploded, perspective view of an enclosure, its cover and a carrier for supporting the same during welding;

FIG. 3 is a perspective view of the bottom of the carrier showing the guiding template thereof;

FIG. 4 is an enlarged, vertical cross-sectional view of the welding apparatus in its standby condition; and FIG. 5 is a view similar to FIG. 4 showing the position of parts during a welding cycle.

DESCRIPTION OF THE PREFERRED EMBODIMENT

In FIG. 2 there is illustrated one type of semiconductor chip 10, the fabrication of which is completed by the method of the instant invention, using our welding apparatus 12. The chip 10 includes an open top square case 14 having a continuous side wall 16 and a bottom 18. A flat, plate-like cover 20 for the case 14 has a size and shape which is complemental to the open top of the case 14. Both the case 14 and the cover 20 are made from a fusible material such as metal.

Otherwise, the nature of the chip 10 forms no part of the present invention. Suffice to say the case 14 contains an integrated circuit, typically a collection of solid state devices such as a large number of transistors, usually made from materials such as silicon or germanium, which work together to perform an electronic function, all as is well known by those skilled in the art of semiconductor chips. The particular chip 10 chosen for illustration has a pair of banks 22 of spaced, electrical conductors extending outwardly in opposite directions from the wall 16 of the case 14.

In using the welder 12 to attach the cover 20 to the case 14 there is provided a carrier 24 of electrical conducting material for the case 14 provided with a guiding template 26 removably attached to its lower surface. On its top surface the carrier has a pair of spaced, parallel, detachable, retaining bars 28 adapted to somewhat snugly receive the case 14 therebetween with the bottom 18 resting on the upper face of the carrier 24. Each bar 28 has a ribbed projection 30 for receiving the conductors of the banks 22, with the two projections 30 diagonally oriented.

The welder 12 includes a hollow base 32 having a table 34 with a working panel 36 recessed therein. A first opening 38 and a second opening 40 are provided in the table 34, the latter registering with a slot 42 in the panel 36. The base 32 has an L-shaped attachment 44 secured to the table 34 and provided with an upper leg 46 spaced above the slot 42.

The leg 46 supports an upper, vertically reciprocable, welding electrode 48 spaced above the carrier 24, together with a suitable prime mover 50, such as an air motor, for reciprocating the electrode 48 toward and away from the carrier 24. A lower, vertically reciprocable, welding electrode 52 in the nature of an elongated rod or similar electric conductor is disposed within the base 32 for movement toward and away from the lower face of the carrier 24. The electrodes 48 and 52 are vertically aligned as shown in FIGS. 4 and 5. Conductors 54 and 56 are releasably attached to the electrodes 48 and 52 respectively for supplying a welding current thereto.

Depending from the table 34 within the base 32 is a support 58 for the electrode 52 having a chamber 60 within which a diaphragm 62 is clamped in place and attached to the electrode 52. The support 58 also receives a tubulator insulator 64 surrounding the electrode 52 above the diaphragm 62 and extending through the opening 40 and the slot 42. Air under pressure is directed to chamber 60 from a line 66.

The support 58 is slidable laterally in the base 32 along tracks 68 within the latter adjacent the table 34, and an air motor 70 in the base 32 has a horizontally reciprocable ram 72 for shifting the support 58 in a direction to hold the carrier 24 and its template 26 against a driven roller 74 disposed above the table 34. A prime mover 76 in the base 32 has an output shaft 78 extending through the opening 38. The roller 74, secured to the shaft 78, is surrounded by a replaceable friction band 80 of resilient material.

A metal bushing 82, rotatable on the electrode 52 within the template 26 and engageable with the internal, upstanding wall of the template 26, surrounds a replaceable disc 84 atop the electrode 52, which disc 84 is, in turn, engageable with the lower surface of the carrier 24. The bushing 82 has an external diameter adapted to complementally fit into each of four, internal corner concavities 86 of the template 26. A magnet 88, inset within the carrier 24, attracts the case 14 against the top of the carrier 24.

Power for the apparatus 12 is supplied from a suitable source through a combination power supply unit and microprocessor 90, the microprocessor being programmed to control the input of power to the apparatus 12 whereby to achieve the operational results described herein. A control panel 94 provides a visual display of the functioning of apparatus 12 and also contains control means for operating the apparatus and for varying the programs of microprocessor 90 whereby chips 10 of various sizes and configurations may be readily processed by the apparatus 12.

OPERATION

The chip 10 is laid on the carrier 24 with the case 14 restrained between the bars 28 and between the projections 30, held by the magnet 88. The conductors of the banks 22 are leaved into the ribs of the projections 30. The cover 20 is then placed on the continuous, upper, out-turned flange of the wall 16 and the unit is then inserted between the retracted electrodes 48 and 52, such that the template 26 rests on the panel 36 adjacent the band 80.

At this juncture, the ram 72 is retracted so as to provide adequate space for receiving the carrier 24 and the template 26 between the roller 74 and the bushing 82, and the elastic diaphragm 62 is contracted such that the disc 84 within the template 26 is spaced from the flat, bottom face of the carrier 24.

The motor 70 is now supplied with air to extend the ram 72, pushing on the support 58 to cause it to slide along the tracks 68 until the bushing 82 firmly engages the continuous inner wall of the template 26 and the continuous outer wall of the template 26 is held tightly against the bank 80.

Air is then supplied to the motor 50 to press the electrode 48 against the cover 20 and air is supplied from line 66 to chamber 60, expanding the diaphragm 62 and raising the electrode 52 until the disc 84 presses against the carrier 24.

Direct current is then directed along the conductors 54 and 56 and the electrodes 48 and 52 to supply the heat required for producing a weld between the cover 20 and the case 14 at the point of contact therebetween while the case and cover are being driven along a path determined by the configuration of template 26. This creates a welding "stitch" which eliminates heating of the case 14 and cover 20 to a point where the contents thereof would be damaged. The heating current is controlled electronically as to amplitude and duration and, as can now be understood, the heat of the current is localized in a direct path from the electrode 48 through the cover 20, the wall 16 and the disc 84 rather than across the materials and circuitry contained in the case 14.

At the completion of each weld cycle the electrodes 48 and 52 are retracted and, while the carrier 24 and template 26 are held against the band 80 by the ram 72, the motor 76 is energized to advance the unit along the panel 36, a controlled distance in readiness for the next succeeding weld. The multiple impulse welds are continued, each overlapping the other, until a continuous "stitch" weld is effected along the entire margin of the cover 20 at its peripheral edge.

During advancement of the package, it will be turned as needed each time the bushing 82 encounters the arcuate corners 86 of the template 26. When chips having configurations and characteristics other than above shown and described, appropriate carriers and templates are provided without need for changes in any other components of the welder 12, all without risk of heat damage to the contents of the chip casing during the welding process.

We claim:

1. Apparatus for welding a package of fusible material having a case and a cover to establish a hermetically sealed joint between the case and the cover, the cover having a marginal edge, said apparatus comprising:
    a pair of reciprocable electrodes for supplying a welding current to the package;
    an electrically conductive, shiftable carrier separate and independent from the electrodes for supporting the package between the electrodes;
    first power means for reciprocating one of the electrodes into and out of engagement with the cover;
    second power means for reciprocating the other electrode into and out of engagement with the carrier; and
    third power means in the form of a driven roller for shifting the carrier at the completion of each weld cycle to relocate the package in position for the next succeeding weld cycle.

2. The invention of claim 1, said carrier having guide means for maintaining the package in preselected relationship to the electrodes during shifting of the package.

3. The invention of claim 2; and means on the carrier for holding the package against displacement relative to the carrier during each weld cycle and during each shifting of the carrier.

4. The invention of claim 1, said carrier having guide means for maintaining the marginal edge of the cover in alignment with one of said electrodes, the electrodes being aligned whereby the heat of the welding current is confined for flow between the electrodes through the carrier at the periphery of the package.

5. The invention of claim 4, wherein said case has a side wall, said carrier holding the wall in alignment with said electrodes whereby said heat flow traverses the wall between the cover and the carrier.

6. In the fabrication of a semiconductor chip having a package of fusible material consisting of a case having a bottom, a cover and a side wall, welding apparatus for attaching the cover at its periphery to said wall, presenting a hermetically sealed joint, said apparatus comprising:
    a pair of aligned electrodes reciprocable toward and away from each other for supplying a welding current of controlled amplitude and duration;
    an electrically conductive carrier separate and apart from the electrodes for supporting the package between the electrodes;
    first power means for reciprocating one of the electrodes into and out of engagement with the cover adjacent said periphery; and
    second power means for reciprocating the other electrode into and out of engagement with the carrier whereby current flow through the cover and the carrier is localized to a direct line across said wall between said cover and said bottom.

7. The invention of claim 6, wherein an impulse of electrical current is imparted to the package whereby to limit the amount and duration of heat imparted to the cover and the wall.

8. The invention of claim 7; and means for relocating the package at completion of each weld cycle whereby to provide a joint having a continuous series of spot welds.

9. The invention of claim 8, said relocating means being a drive for successive shifting of the carrier in limited increments to overlap the welds and provide a seam weld.

10. The invention of claim 9, said carrier having means for guiding the said carrier as it is shifted whereby the weld seam is continuous along the entire marginal edge of the cover.

11. The method of resistance welding a package of fusible material having a case and a cover to provide a hermetically sealed joint between the case and the cover, the cover having a marginal edge, said method comprising the steps of:
   placing the package on an electrically conductive carrier;
   maintaining the carrier functionally separate from the electrodes;
   successively shifting a pair of aligned electrodes capable of supplying a direct welding current until one of the electrodes presses against the cover at its marginal edge and the other electrode presses against the carrier;
   effecting a weld cycle of controlled amplitude and duration during each such pressing engagement of the electrodes until a seam weld is established;
   releasing said pressing engagements of the electrodes at the completion of each weld interval; and
   indexing the carrier to relocate the package for the next succeeding weld cycle.

12. The invention of claim 11, wherein the case has a side wall, said method including the step of locating the wall with its transverse axis in alignment with the electrodes.

13. The invention of claim 12; and limiting each weld cycle to a short duration impulse of electrical current between the electrodes along a narrow, confined path through the cover and said wall.

14. The invention of claim 13; and overlapping the localized welds to provide an uninterrupted series of spot welds, forming said seam weld.

15. The invention of claim 14; and restraining the package against displacement on the carrier during the weld cycles and during the indexing of the carrier.

16. In the fabrication of a semiconductor chip having a package of fusible material consisting of a case having a bottom, a cover having a marginal edge and a side wall, a method of resistance welding for attaching the cover at its periphery to said wall by application of heat and pressure, presenting a hermetically sealed joint, said method including the steps of:
   supporting the package on an electrically conductive carrier between a pair of aligned, shiftable electrodes;
   maintaining the carrier functionally separate from the electrodes;
   shifting one of the electrodes into engagement with the cover adjacent said periphery and said wall;
   shifting the other electrode into engagement with the carrier; and
   supplying the electrodes with an intermittent welding current.

17. The invention of claim 16; and restricting the welding current to an impulse of short duration flowing along a narrow path between the electrodes.

18. The invention of claim 17; advancing the package minutely and intermittently while the electrodes are out of engagement with the cover and the carrier; and completing a weld cycle each time the package is at rest.

19. The invention of claim 18; and controlling the advancement of the package to a path extending along and throughout the marginal edge of the cover.

20. The invention of claim 19; and controlling the duration of movement of the package during each successive advancement to provide a joint consisting of a series of overlapped spot welds.

* * * * *